(12) United States Patent
Levin (10) Patent No.: US 9,813,406 B2
(45) Date of Patent: Nov. 7, 2017

(54) DEVICE AUTHENTICATION IN AD-HOC NETWORKS

(71) Applicant: EMPIRE TECHNOLOGY DEVELOPMENT LLC, Wilmington, DE (US)

(72) Inventor: Pavel Levin, Brooklyn, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/370,637

(22) PCT Filed: Feb. 20, 2014

(86) PCT No.: PCT/US2014/017383
§ 371 (c)(1),
(2) Date: Jul. 3, 2014

(87) PCT Pub. No.: WO2015/126398
PCT Pub. Date: Aug. 27, 2015

(65) Prior Publication Data
US 2015/0237040 A1    Aug. 20, 2015

(51) Int. Cl.
*H04L 29/06* (2006.01)
*G06F 17/30* (2006.01)
(Continued)

(52) U.S. Cl.
CPC .......... *H04L 63/0823* (2013.01); *H04L 63/18* (2013.01)

(58) Field of Classification Search
CPC .... H04L 9/3278; H04L 63/0823; H04L 63/18
(Continued)

(56) References Cited

U.S. PATENT DOCUMENTS 7,120,797 B2 * 10/2006 Wheeler ............... H04L 9/0844
380/277
8,090,949 B2   1/2012 Bellur et al.
(Continued)

FOREIGN PATENT DOCUMENTS

EP          1596529 B1     12/2007

OTHER PUBLICATIONS

Wayne Jansen; Privilege Management of Mobile Agents; Year:2000; National Institute of Standards and Technology; p. 1-9.*
(Continued)

*Primary Examiner* — Monjour Rahim
(74) *Attorney, Agent, or Firm* — Moritt Hock & Hamroff LLP; Steven S. Rubin, Esq.

(57) ABSTRACT

Technologies are generally described for methods and systems effective to authenticate an invited device. In some examples, a method for authenticating an invited device may include receiving, by an evaluating device, a first message from the invited device. The evaluating device may receive the first message at a first receiving time. The method may also include receiving, by the evaluating device, a second message from the inviting device. The evaluating device may receive the second message at a second receiving time. A first sending time, of the first message, and a second sending time, of the second message, may be mutually synchronized. The method may also include determining a receiving time difference between the first receiving time and the second receiving time. The method may also include, by the evaluating device, authenticating the invited device based on the receiving time difference, the first message and the second message.

18 Claims, 6 Drawing Sheets

(51) Int. Cl.
*G06F 15/16* (2006.01)
*G06F 7/04* (2006.01)

(58) Field of Classification Search
USPC .......................................................... 726/7
See application file for complete search history.

(56) References Cited

U.S. PATENT DOCUMENTS

| | | | |
|---|---|---|---|
| 8,311,726 B2 | 11/2012 | Patel et al. | |
| 8,311,730 B2 | 11/2012 | Neff | |
| 8,315,757 B2 | 11/2012 | Yamamura et al. | |
| 8,359,643 B2* | 1/2013 | Low | H04W 4/08 370/254 |
| 8,397,063 B2* | 3/2013 | DiCrescenzo | H04L 9/006 713/158 |
| 2003/0204734 A1* | 10/2003 | Wheeler | H04L 9/0844 713/184 |
| 2005/0154914 A1* | 7/2005 | Eguchi | G06F 21/35 726/4 |
| 2005/0219042 A1 | 10/2005 | Thomson | |
| 2006/0020380 A1 | 1/2006 | Saito et al. | |
| 2006/0075222 A1 | 4/2006 | Moloney et al. | |
| 2006/0179311 A1* | 8/2006 | McCorkle | G01S 7/023 713/168 |
| 2006/0253236 A1 | 11/2006 | Hawkins et al. | |
| 2007/0013497 A1 | 1/2007 | Watanabe | |
| 2007/0106430 A1 | 5/2007 | Goto et al. | |
| 2007/0262853 A1 | 11/2007 | Bradus et al. | |
| 2008/0133761 A1* | 6/2008 | Polk | H04L 63/0428 709/228 |
| 2008/0240440 A1* | 10/2008 | Rose | H04L 63/08 380/277 |
| 2008/0244271 A1 | 10/2008 | Yu | |
| 2008/0301776 A1* | 12/2008 | Weatherford | G06F 21/31 726/3 |
| 2009/0096599 A1 | 4/2009 | Kranz | |
| 2009/0150562 A1 | 6/2009 | Kim et al. | |
| 2010/0069067 A1 | 3/2010 | Vanderveen et al. | |
| 2011/0023097 A1* | 1/2011 | McDiarmid | H04L 63/08 726/5 |
| 2011/0321145 A1* | 12/2011 | Shimotono | G06F 21/31 726/7 |
| 2012/0151566 A1* | 6/2012 | Lin | H04L 63/0428 726/7 |
| 2012/0166514 A1* | 6/2012 | Mathew | G06F 9/5083 709/201 |
| 2013/0152128 A1* | 6/2013 | Tanna | H04N 21/4126 725/39 |
| 2013/0232565 A1* | 9/2013 | O'Connor | H04B 7/18584 726/13 |
| 2014/0026193 A1* | 1/2014 | Saxman | G06F 21/33 726/4 |
| 2014/0150080 A1* | 5/2014 | Miller | G06F 21/10 726/9 |
| 2014/0165191 A1* | 6/2014 | Ahn | H04L 63/1425 726/22 |
| 2015/0052352 A1* | 2/2015 | Dolev et al. | 713/156 |
| 2015/0055504 A1* | 2/2015 | Bellamkonda | H04W 40/246 370/254 |

OTHER PUBLICATIONS

International Search Report and Written Opinion for International Application No. PCT/US2014/017383, mailed on Jun. 2, 2014, 12 pages.

Jiménez, W., et al., "Authentication Services in Mobile Ad-hoc Networks," TELECOM & Management SudParis Département LOR, 2008, pp. 1-41.

Jingle, I. D. J. and Rajsingh, E. B., "Defending IP Spoofing Attack and TCP SYN Flooding Attack in Next Generation Multi-hop Wireless Networks," International Journal of Information & Security (IJINS), 2013, pp. 160-166, vol. 2, No. 2.

Li, F. and Wu, J., "Frame: An Innovative Incentive Scheme in Vehicular Networks," IEEE International Conference on Communications, 2009, pp. 1-6.

Raya, M. and Hubaux, J.-P., "Securing vehicular ad hoc networks," Journal of Computer Security, 2007, pp. 39-68, vol. 15.

Alattar, M., et al., "Trust-Enabled Link Spoofing Detection in MANET," Proceedings of the 2012 32nd International Conference on Distributed Computing Systems Workshops, pp. 237-244 (2012).

Bhaya, W.S., and Alasadi, S.A., "Security against Spoofing Attack in Mobile Ad Hoc Networks," European Journal of Scientific Research, vol. 64, No. 4, pp. 634-643 (2011).

International Search Report and Written Opinion for International Application No. PCT/US2014/033501, mailed on Jan. 9, 2015, 13 pages.

Jansen, W. and Karygiannis, T., "Privilege Management of Mobile Agents," National Information System Security Conference pp. 1-9 (2000).

Lee, T.B., "Innovation vs. Safety in Self-driving Technologies," accessed at http://web.archive.org/web/20130831214856/https://freedom-to-tinker.com/blog/tblee/innovation-vs-safety-self-driving-technologies/, Nov. 11, 2008, pp. 6.

Pinto, C., "How Autonomous Vehicle Policy in California and Nevada Addresses Technological and Non-Technological Liabilities," Intersect: The Stanford Journal of Science, Technology and Society, vol. 5, No. 1, pp. 1-16 (2012).

\* cited by examiner

DEVICE AUTHENTICATION IN AD-HOC NETWORKS

CROSS REFERENCE TO RELATED APPLICATION

This application is the U.S. national stage filing under 35 U.S.C. §371 of International Application No. PCT/US12/17383 filed on Feb. 20, 2014. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

Two or more devices may form a network of decentralized type such as an ad-hoc network by establishing communication links with each other. Establishment of communication links may facilitate transmission of data inside of the decentralized type network. A device may join the decentralized type network based on identification information such as a password. Devices may be configured to accept and/or reject requests to establish communication links and/or to transmit data with each other.

SUMMARY

In some examples, methods for authenticating an invited device are generally described. The methods may include receiving, by an evaluating device, a first message from the invited device. The evaluating device may receive the first message at a first receiving time. The methods may also include receiving, by the evaluating device, a second message from the inviting device. The evaluating device may receive the second message at a second receiving time. The methods may also include determining a receiving time difference between the first receiving time and the second receiving time. The methods may also include, by the evaluating device, authenticating the invited device based on the receiving time difference, the first message and the second message.

In some examples, systems configured to authenticate an invited device are generally described. The systems may include an evaluating device. The systems may also include an inviting device. The inviting device may be configured to be in communication with the evaluating device. The evaluating device may be configured to receive, from the invited device, a first message at a first receiving time. The evaluating device may also be configured to receive, from an inviting device, a second message at a second receiving time. The evaluating device may also be configured to determine a receiving time difference between the first receiving time and the second receiving time. The evaluating device may also be configured to authenticate the invited device based on the receiving time difference, the first message, and the second message.

In some examples, methods for authenticating an invited device are generally described. The methods may include establishing, by an inviting device, a secure communication link, which is a first communication link with the invited device. The methods may also include determining a start time by the inviting device. The methods may also include sending an indication of the start time from the inviting device to the invited device through the first communication link. The methods may also include sending, by the inviting device, a first message to an evaluating device at the start time. The methods may also include receiving, by the invited device, the indication of the start time from the inviting device through the first communication link. The methods may also include sending, by the invited device, a second message to the evaluating device through a second communication link at the start time. The methods may also include receiving, by the evaluating device, the first message from the invited device at a first receiving time. The methods may also include receiving, by the evaluating device, the second message from the inviting device at a second receiving time. The methods may also include determining a receiving time difference between the first receiving time and the second receiving time. The methods may also include authenticating, by the evaluating device, the invited device based on the receiving time difference, the first message and the second message.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to device authentication in an ad-hoc network.

Briefly stated, technologies are generally described for methods and systems effective to authenticate an invited device. In some examples, a method for authenticating an invited device may include receiving, by an evaluating device, a first message from the invited device. The evaluating device may receive the first message at a first receiving time. The method may also include receiving, by the evaluating device, a second message from the inviting device. The evaluating device may receive the second message at a second receiving time. A first sending time, of the first message, and a second sending time, of the second message, may be mutually synchronized. The method may also include determining a receiving time difference between the first receiving time and the second receiving time. The method may also include, by the evaluating device, authenticating the invited device based on the receiving time difference, the first message and the second message.

Figure 1:
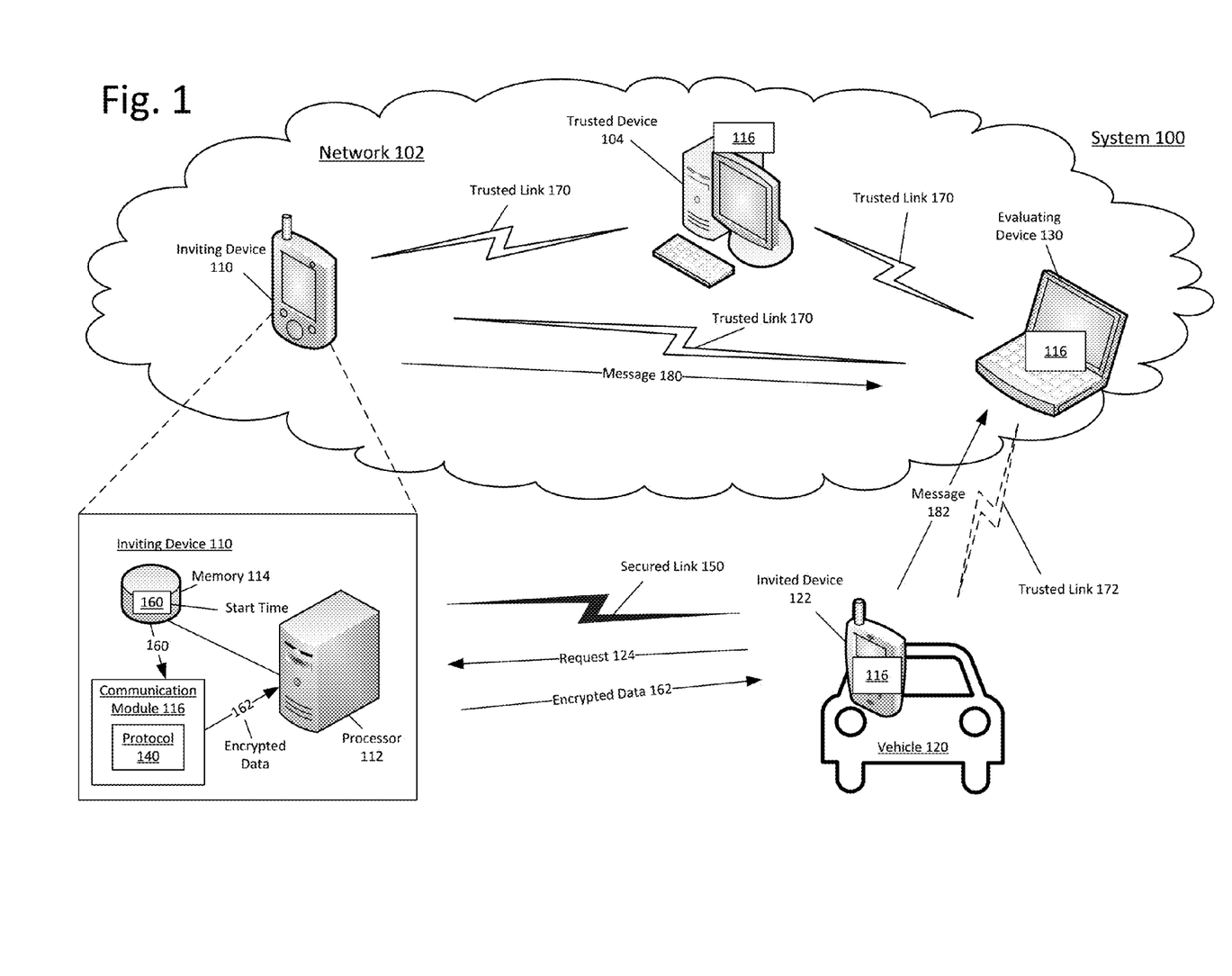
FIG. 1 illustrates an example system that can be utilized to implement device authentication in an ad-hoc network.

FIG. 1 illustrates an example system 100 that can be utilized to implement device authentication in an ad-hoc network, arranged in accordance with at least some embodiments described herein. System 100 may include one or more devices such as a trusted device 104, an inviting device 110, and/or an evaluating device 130. In some examples, system 100 may include more than one trusted device 104. In some examples, system 100 may not include trusted device 104. Trusted device 104, inviting device 110, and/or evaluating device 130 may be configured to be in communication with each other through one or more trusted links such as trusted link 170 inside of a coverage area of a network 102, which may have internal (e.g., Intranet) or external network connection (e.g., the Internet, 4G wireless network). Network 102 may be a decentralized wireless network such as an ad-hoc Transmission Control Protocol/Internet Protocol (TCP/IP) network, ad-hoc secure service network (SSN), a mobile ad-hoc network, a vehicular ad-hoc network, etc. Trusted device 104, inviting device 110, and/or evaluating device 130 may be a device such as a computer, a cellular phone or a vehicular communication device. As discussed in more detail below, trusted device 104, inviting device 110, and/or evaluating device 130 may be configured to authenticate an invited device 122 based on a message 180 sent from inviting device 110 to evaluating device 130, a message 182 sent from invited device 122 to evaluating device 130, and/or corresponding receiving times. Inviting device 110 and invited device 122 may be mutually synchronized such as through a secured link 150 (described below) so that messages sent are synchronized. Synchronized messages may be sent at the same time or sent at a defined time difference. Messages 180, 182 may be sent correspondingly by inviting device 110 and invited device 122 to evaluating device 130 in response to the mutual synchronization of inviting device 110 and invited device 122 and in response to determination of sending times of messages 180, 182. In some examples, inviting device 110 may be disposed in an infrastructure (e.g., roadside) apparatus or in a vehicle. Invited device 122 may be disposed in a vehicle 120.

Trusted device 104, inviting device 110, and evaluating device 130 may each include a communication module 116. Inviting device 110 may further include a processor 112 and/or a memory 114. Processor 112 may be configured to be in communication with memory 114 and/or communication module 116. In some examples, communication module 116 of inviting device 110 may be a part of processor 112. Memory 114 may store an indication of a time such as a start time 160. Communication module 116 may store a protocol 140. Communication module 116 of inviting device 110 may be configured to access data in memory 114. Communication module 116 may further store and/or retrieve an indication of start time 160 from memory 114 in response to instructions in protocol 140. In some examples, protocol 140 in communication module 116 may include a random number generator. Processor 112 of inviting device 110 may generate start time 160 such as by executing the random number generator prior to storing the indication of start time 160 in memory 114. Communication module 116 of inviting device 110 may be configured to generate encrypted data 162 by encryption of the indication of start time 160 (e.g., encrypting "13:58:12.20"). Communication module 116 of inviting device 110 may be configured to send encrypted data 162 to processor 112.

Communication module 116 may be configured to establish secured link 150 between inviting device 110 and invited device 122. Secured link 150 may be a wired link such as cable or a short-range wireless link such as Near-Field Communication (NFC) and/or Bluetooth and/or Dedicated Short-Range Communications (DSRC) such as vehicle-to-vehicle (V2V) and vehicle-to-infrastructure (V2I) communications. Standard TCP/IP and/or DNS (domain name service) data may be transferred, for routing purposes, through secured link 150. Secured link 150 may have a higher level of security than trusted link 170. Using secured link 150, inviting device 110 and invited device 122 may be, according to protocol 140, securely paired one with another, preferably in close proximity, and/or mutually authenticated with generating a common cryptographic key and/or issuing pairwise symmetric keys. Internal clocks of inviting device 110 and invited device 122 may be mutually synchronized. Then, for example at 13:58:12.00, inviting device 110 (preferably) generates start time 160 and encrypted data 162 (e.g., "13:58:12.20"). Communication module 116 may be configured to send encrypted data 162 to invited device 122. In some examples, encrypted data 162 may include an indication of start time 160 and/or additional data such as an identification (such as IP addresses of inviting device 110 and/or evaluating device 130, etc.), an instruction, and/or an indication of a time interval (described below).

Invited device 122 may also include communication module 116. Communication module 116 of invited device 122 may receive and may decode encrypted data 162. As explained in more detail below, invited device 122 may send message 182 to evaluating device 130 at a first sending time. Inviting device 110 may send message 180 to evaluating device 130 at a second sending time. The first sending time and the second sending time may coincide with start time 160 as a result of the mutual synchronization between inviting device 110 and invited device 122. Evaluating device 130 may authenticate invited device 122 based on message 180, message 182, and/or corresponding receiving times of messages 180, 182 at evaluating device 130. Message 180 and message 182 may include the same or different contents such as timestamps (e.g., "13:58:12.20"), identification (including IP addresses), etc. Message 182 may include an identification description relating to inviting device 110. Based on a time difference between a receiving time of message 180 and a receiving time of message 182, evaluating device 130 may authenticate invited device 122, and a trusted link 172 between invited device 122 and evaluating device 130 may be established. In some examples, trusted link 172 may be commenced by invited device 122 by sending message 182 to IP address of evaluating device 130 in synchronized manner with message 180. In some examples, trusted link 172 may be established simultaneously between invited device 122 and trusted device 104, by sending message 180 and message 182 additionally to trusted device 104. Trusted link 170 and trusted link 172 may be of a same security level and may be of a same communication protocol such as a cellular network communication protocol.

Figure 2:
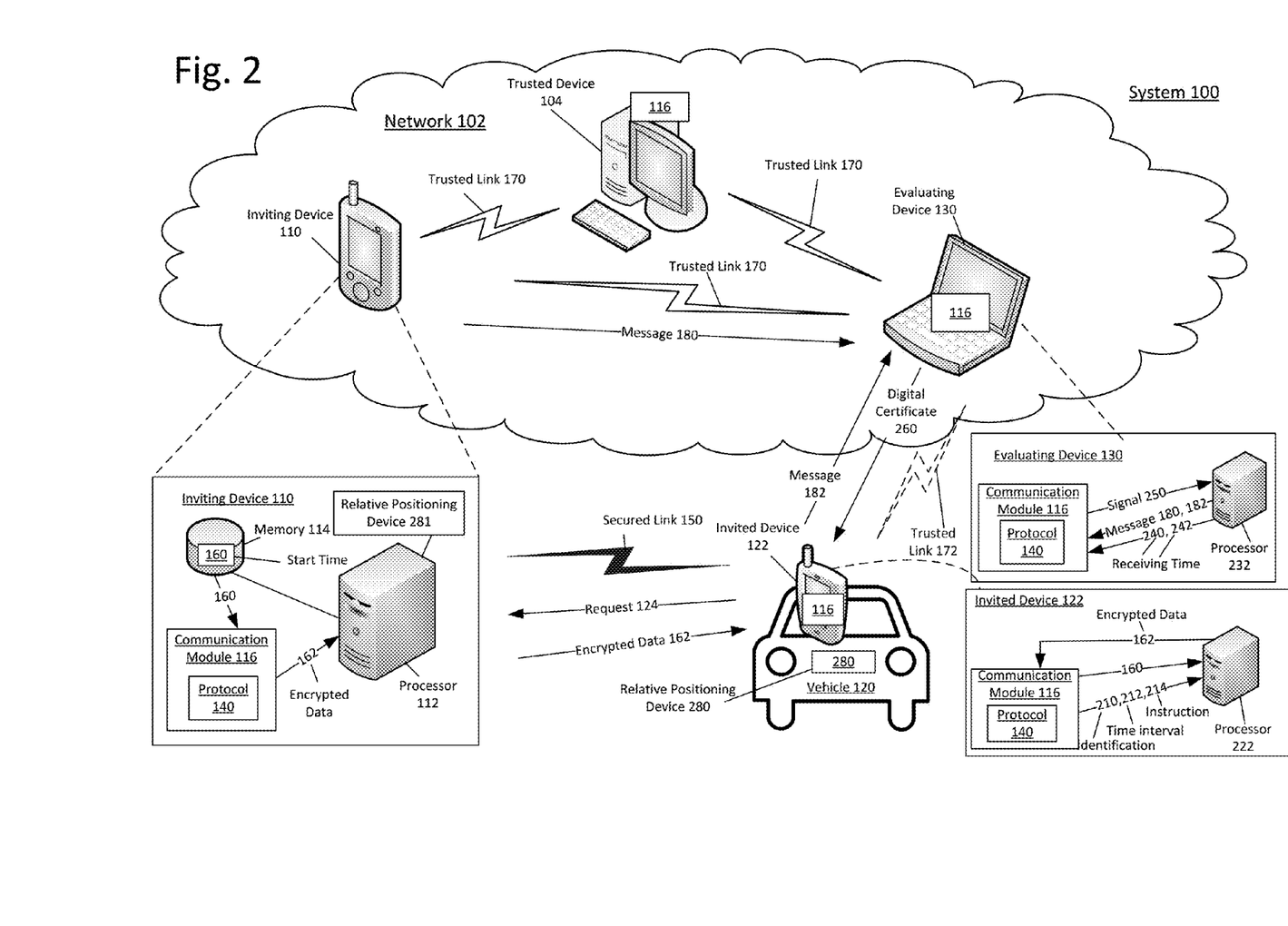
FIG. 2 illustrates the example system of FIG. 1 with additional detail relating to an evaluating device and an invited device.

FIG. 2 illustrates system 100 of FIG. 1 with additional detail relating to the evaluating device and the invited device, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

In some examples, vehicle 120 may include a global positioning system (GPS) device and/or a relative positioning system device 280 such as relative (local) positioning system sensor (e.g., electronic stereoscopic cameras and/or radars and/or lasers for capturing images of objects, determining distance to objects, etc.) and/or a monitoring (piloting) unit. A structure including inviting device 110, such as a vehicle or a roadside apparatus, may include a GPS device and/or relative positioning device 281 and/or a monitoring (piloting) unit. In some examples, trusted device 104 and/or evaluating device 130 also may be disposed in a roadside apparatus or in a respective vehicle that may include a respective a GPS device and/or relative positioning system device such as relative positioning system sensor. In some examples, when secured link 150 is established between inviting device 110 and invited device 122, relative positioning system device 281 installed on the vehicle (roadside apparatus), which includes inviting device 110, may interact with vehicle 120 in order to confirm location of vehicle 120 and, thus, to protect secured link 150. In other examples, relative positioning system device 281 and relative positioning system device 280 installed on vehicle 120 may be configured to be in communication with each other to protect secured link 150. In an example, inviting device 110 may establish secured link 150 with invited device 122. Invited device 122 may receive encrypted data 162 from inviting device 110 through secured link 150. Invited device 122 may include a processor 222 and/or communication module 116. Processor 222 may send encrypted data 162 to communication module 116 of invited device 122. Communication module 116 of invited device 122 may execute instructions in protocol 140 to decrypt encrypted data 162 to identify start time 160. Communication module 116 of invited device 122 may then send an indication of start time 160 to processor 222. For example, an indication of start time of 13:58:12.20 may be encrypted by processor 222 and the encrypted data may be sent to communication module 116. Communication module 116 may receive and decrypt the data to recover the indication of start time 160. In some examples, encrypted data 162 may further include an identification 210, an indication of a time interval 212, and/or an instruction 214. Identification 210 may be an identification that identifies inviting device 110 such as a media access control (MAC) address and/or international mobile subscriber identity (IMSI). In some examples, identification 210 also may include IP address of evaluating device 130 and/or of trusted device 104. Time interval 212 may be generated by communication module 116 of inviting device 110 such as by using protocol 140 in communication module 116. Time interval 212 may be a time period such as 30 minutes in a case of a mobile ad-hoc network, for example, of some event (such as conference). In another example (such as in a case of a vehicular ad-hoc network) time interval 212 may be 3 seconds. Instruction 214 may be an instruction to command invited device 122 to send message 182 to evaluating device 130 at start time 160. Processor 222 may execute instruction 214 and may send message 182 to evaluating device 130 at start time 160. Message 182 may include identification 210 and a timestamp. The timestamp may indicate that invited device 122 sent message 182 at start time 160.

In an example where encrypted data 162 includes time interval 212, inviting device 110 and invited device 122 may respectively send messages 180, 182 to evaluating device 130 periodically based on time interval 212. Instruction 214 may further include instructions to command invited device 122 to receive encrypted data 162 at time corresponding to time interval 212 from inviting device 110. In other examples, encrypted data 162 may be received from trusted device 104; and message 180 may be sent from trusted device 104. After receiving encrypted data 162, invited device 122 may send message 182 to evaluating device 130 at each time interval 212 starting with start time 160. For example, time interval 212 may be 30 minutes and encrypted data 162 in the above example is sent at 14:28:12.00 by inviting device 110 and received at 14:28:12.02 (i.e., in approximately 2 milliseconds). The encrypted data 162 in the above example may include start time 160 which may be "14:28:13.03". Inviting device 110 and invited device 122 may respectively send messages 180, 182 to evaluating device 130 at regular intervals—at 13:58:13.03, 15:28:12.33, 14:58:12.52, etc. Inviting device 110 and invited device 122 may respectively send messages 180, 182 to evaluating device 130 at approximately each 30 minute interval until invited device 122 leaves the coverage area of network 102.

Evaluating device 130 may include a processor 232 and communication module 116. Evaluating device 130 may receive message 180 from inviting device 110 at a receiving time 240. Evaluating device 130 may receive message 182 from invited device 122 at a receiving time 242. Processor 232 may send messages 180, 182 and/or data relating to receiving times 240, 242 to communication module 116 of evaluating device 130. Communication module 116 of evaluating device 130 may retrieve identification 210 from message 182. Communication module 116 of evaluating device 130 may execute instructions in protocol 140 to determine a time difference between receiving time 240 and receiving time 242.

In some examples, evaluating device 130 may receive more than two messages. Communication module 116 of evaluating device 130 may analyze message 182 and may identify message 180 based on identification 210. For example, identification 210 may include a physical address of inviting device 110. Message 182 may include identification 210. Identification 210 may indicate that invited device 122 sent message 182 synchronized with inviting device 110 sending message 180. In some examples, messages 180, 182 may be sent at the same time corresponding to start time 160. In other examples, messages 180, 182 may be sent at different but synchronized times. Evaluating device 130 may measure a time difference between receiving times and authenticate invited device 122 in response. In some examples, evaluating device 130 may authenticate invited device 122 when the time difference is below a threshold. In some examples, the threshold may have a different value depending on the particular device in network 102 with which invited device 122 which would like to communicate. In examples where messages 180, 182 are sent at different times, evaluating device 130 may account for the difference when measuring the time difference and determining whether to authenticate.

In an example, instructions in protocol 140 may include a threshold such as 2.1 milliseconds (depending on the accuracy of devices 110, 122 synchronization and messages 180, 182 transmission time). Communication module 116 of evaluating device 130 may determine a time difference of 68.4 milliseconds between receiving time 240 and receiving time 242. Communication module 116 of evaluating device 130 may analyze instructions in protocol 140 and determine that the time difference of 68.4 milliseconds is larger than the threshold of 2.1 milliseconds. Communication module 116 of evaluating device 130 may write a value such as '0' to a signal 250 and may send signal 250 to processor 232. Processor 232 may receive signal 250 and may decline to establish trusted link 172 with invited device 122.

In an example, communication module 116 of evaluating device 130 may determine a time difference of 1.0 milliseconds between receiving time 240 and receiving time 242. Communication module 116 of evaluating device 130 may analyze instructions in protocol 140 and determine that the time difference 1.0 milliseconds is less than the threshold of 2.1 milliseconds. Communication module 116 of evaluating device 130 may write a value such as '1' to signal 250 and may send signal 250 to processor 232. Processor 232 may receive signal 250 and may establish trusted link 172 with invited device 122. Processor 232 may send a digital certificate 260 to invited device 122 to indicate authentication of invited device 122. Processor 232 may determine an expiration time of digital certificate 260 in response to sending digital certificate 260 to invited device 122.

In an example, encrypted data 162 may include a time interval 212 of 30 minutes corresponding to the expiration time of digital certificate 260, which is 30 minutes. Digital certificate 260 may expire at 14:28:12.00 and evaluating device 130 may revoke the digital certificate from invited device 122 at 14:28:12.00. Processor 112 of inviting device 110 may thereafter repeat the process of establishing secured link 150 with invited device 122 and sending indications of another start time 160 and/or another time interval 212 to invited device 122. After invited device 122 receives digital certificate 260 from evaluating device 130, inviting device 110 may send encrypted data 162 including indications of another start time 160 and/or another time interval 212 to invited device 122 through secured link 150.

Figure 3:
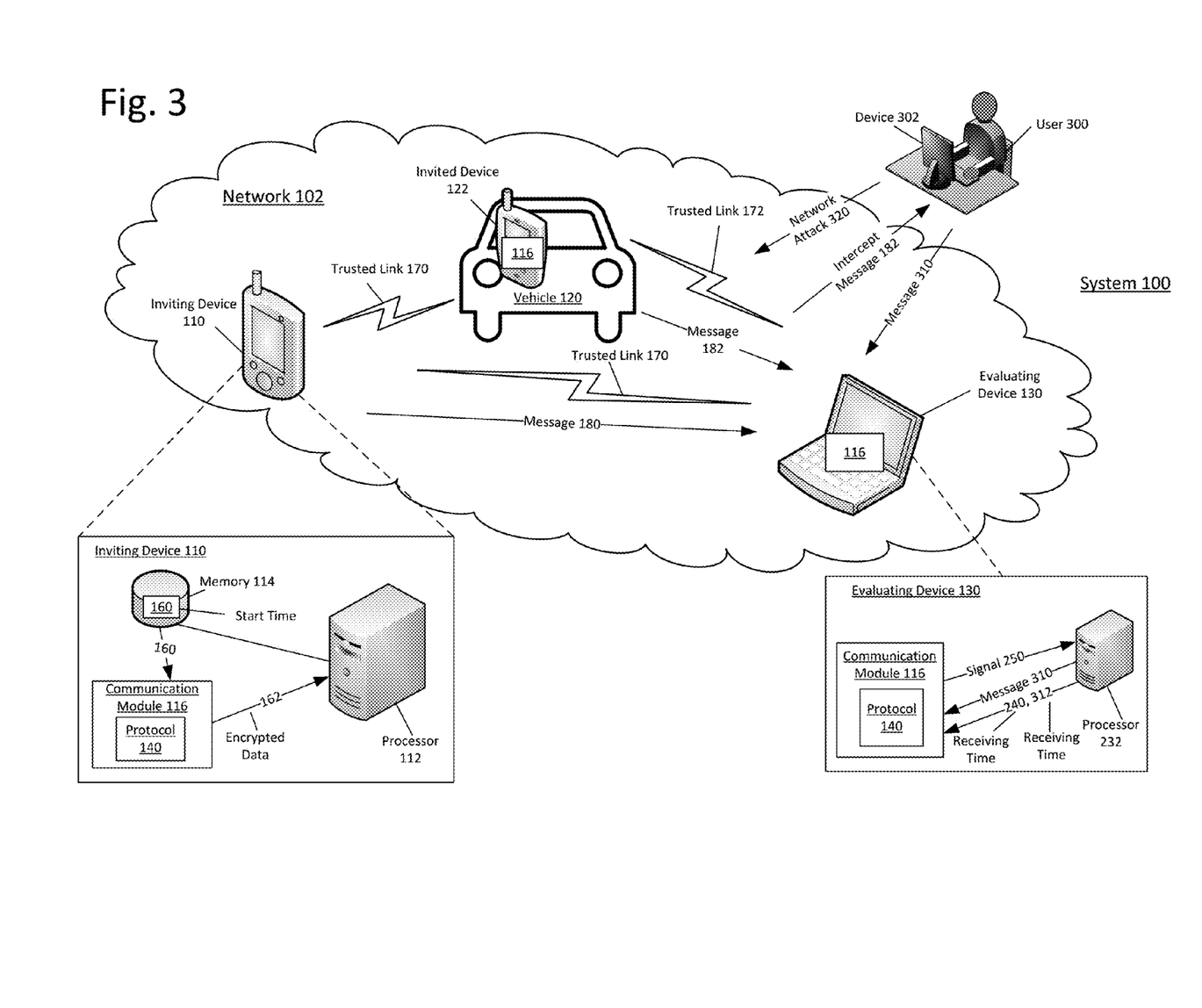
FIG. 3 illustrates the example system of FIG. 1 with additional detail relating to a potential attack by a malevolent user.

FIG. 3 illustrates system 100 of FIG. 1 with additional detail relating to a potential attack by a malevolent user, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

A malevolent user 300 outside the coverage area of network 102 may use a device 302 to perform a network attack 320 on network 102. Network attack 320 may be a denial-of-service attack, a man-in-the-middle attack, a sniffer attack, an identity spoofing attack, etc. User 300 may use device 302 to intercept message 182 during transmission of message 182 from invited device 122 to evaluating device 130. Device 302 may generate a message 310 in response to interception of message 182. Message 310 may include identification 210.

In an example, device 302 may send message 310 to evaluating device 130 at a time different from start time 160. Evaluating device 130 may receive message 310 from device 302 at a receiving time 312. Message 310 may include identification 210 that may suggest that device 302 is sending message 310 synchronized with inviting device 110 sending message 180. Message 310 may even include a time stamp that corresponds to start time 160. Communication module 116 of evaluating device 130 may execute instructions in protocol 140 to determine a time difference between receiving time 240 of message 180 and receiving time 312 of message 310. Communication module 116 of evaluating device 130 may determine a time difference over a threshold between receiving time 240 and receiving time 312. The time difference may be a result of device 302 sending message 310 at a time different from start time 160. Evaluating device 130 may decline to authenticate device 302 and may not establish trusted link 172 with device 302 in response to determining the time difference.

Among other possible benefits, a system in accordance with the disclosure may benefit users inside of an ad-hoc or decentralized network. For example, users in an event such as a conference may desire to share information, such as business contacts, with each other by transmitting electronic data using respective personal devices such as cellular phones. A system in accordance with the disclosure may enable users in such events with the ability to determine if a potential invited device may be trusted and if data may be shared with the invited device. A system in accordance with the disclosure may reduce an amount of authentication resources and/or time by allowing devices in the ad-hoc or decentralized network to authenticate an invited device without use of a device outside of the network. A data breach of one part of the network may not affect another part of the network as invited devices may be added to the network on an ad-hoc basis.

In another example, users in a vehicular ad-hoc network may benefit from a system in accordance with the disclosure. Users who are operating respective vehicles with respective devices such as cellular phones may determine if a roadside apparatus, or other vehicles inside of the vehicular ad-hoc network with data provided by devices and systems such as GPS (global positioning system), camera, radar (local or relative positioning system), navigation system, may be trusted. For example, a first user operating a first vehicle with a first device may inquire about traffic conditions on the road ahead. A second user operating a second vehicle with a second device may receive the inquiry. The second user may use the second device to provide the traffic conditions to the first user. The first user may determine, using methods discussed herein, if the information received from the second user may be trusted. In another example, the first user may inquire about a route to a destination. A user outside of the vehicular ad-hoc network may perform a network attack and provide falsified instructions to the first user. The first user may decline to trust the falsified instructions based on the results of an implementation of a system in accordance with the disclosure.

Figure 4:
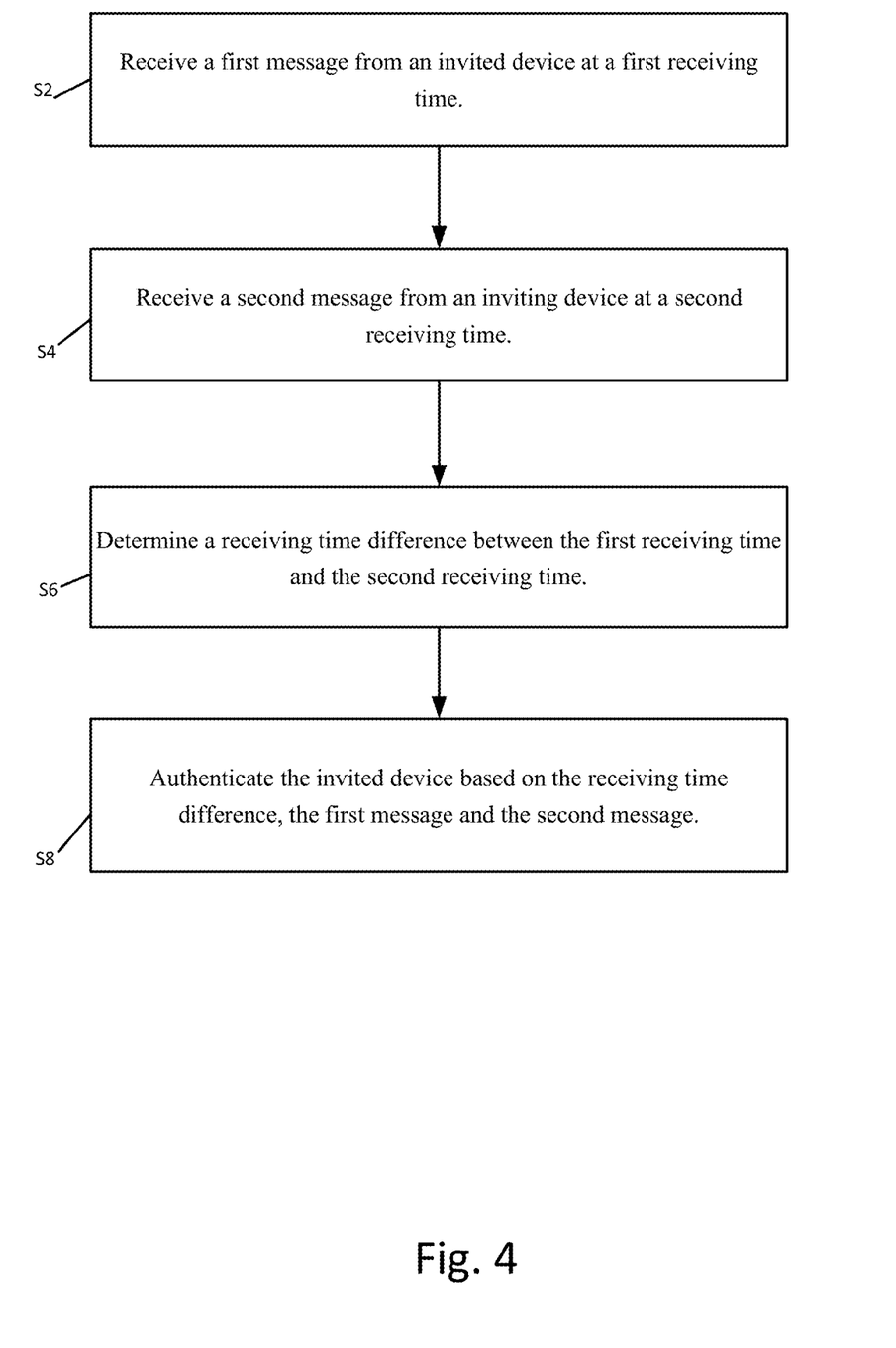
FIG. 4 illustrates a flow diagram for an example process for implementing device authentication in an ad-hoc network.

FIG. 4 illustrates a flow diagram for an example process for implementing device authentication in an ad-hoc network, arranged in accordance with at least some embodiments presented herein. The process in FIG. 4 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Receive a first message from an invited device at a first receiving time." At block S2, an evaluating device may receive a first message from an invited device at a first receiving time. The first message may include an identification associated with an inviting device. The invited device may be disposed in a vehicle that includes a global positioning system sensor and/or a monitoring unit.

Processing may continue from block S2 to block S4, "Receive a second message from an inviting device at a second receiving time." At block S4, the evaluating device may receive a second message from the inviting device at a second receiving time. Prior to receiving the first and second message at the evaluating device, the inviting device may establish a communication link with the invited device. The inviting device may also determine a start time. The inviting device may also encrypt an indication of the start time. The inviting device may also send the indication of the start time to the invited device through the communication link. The inviting device may also send the second message to the evaluating device at the start time. In some examples, the inviting device may also send an indication of a time interval to the invited device through the communication link. The inviting device may also repeatedly send the second message to the evaluating device at a period that corresponds to the time interval.

The invited device may receive the indication of the start time from the inviting device through the communication link. The invited device may also send the first message to the evaluating device at the start time. In some examples, the invited device may receive the indication of the time interval from the inviting device through the communication link. The invited device may also repeatedly send the first message to the evaluating device at a period that corresponds to the time interval.

Processing may continue from block S4 to block S6, "Determine a receiving time difference between the first receiving time and the second receiving time." At block S6, the evaluating device may determine a receiving time difference between the first receiving time and the second receiving time.

Processing may continue from block S6 to block S8, "Authenticate the invited device based on the receiving time difference, the first message and the second message." At block S8, the evaluating device may authenticate the invited device based on the receiving time difference, the first message and the second message. The communication link may be a first communication link. The evaluating device may also establish a second communication link with the invited device in response to the authentication of the invited device. The evaluating device may also send a digital certificate to the invited device through the second communication link. The evaluating device may also receive the first and second message by the evaluating device through a second communication link. The evaluating device may also determine an expiration time of the digital certificate. The first communication link may have a higher level of security than the second communication link.

Figure 5:
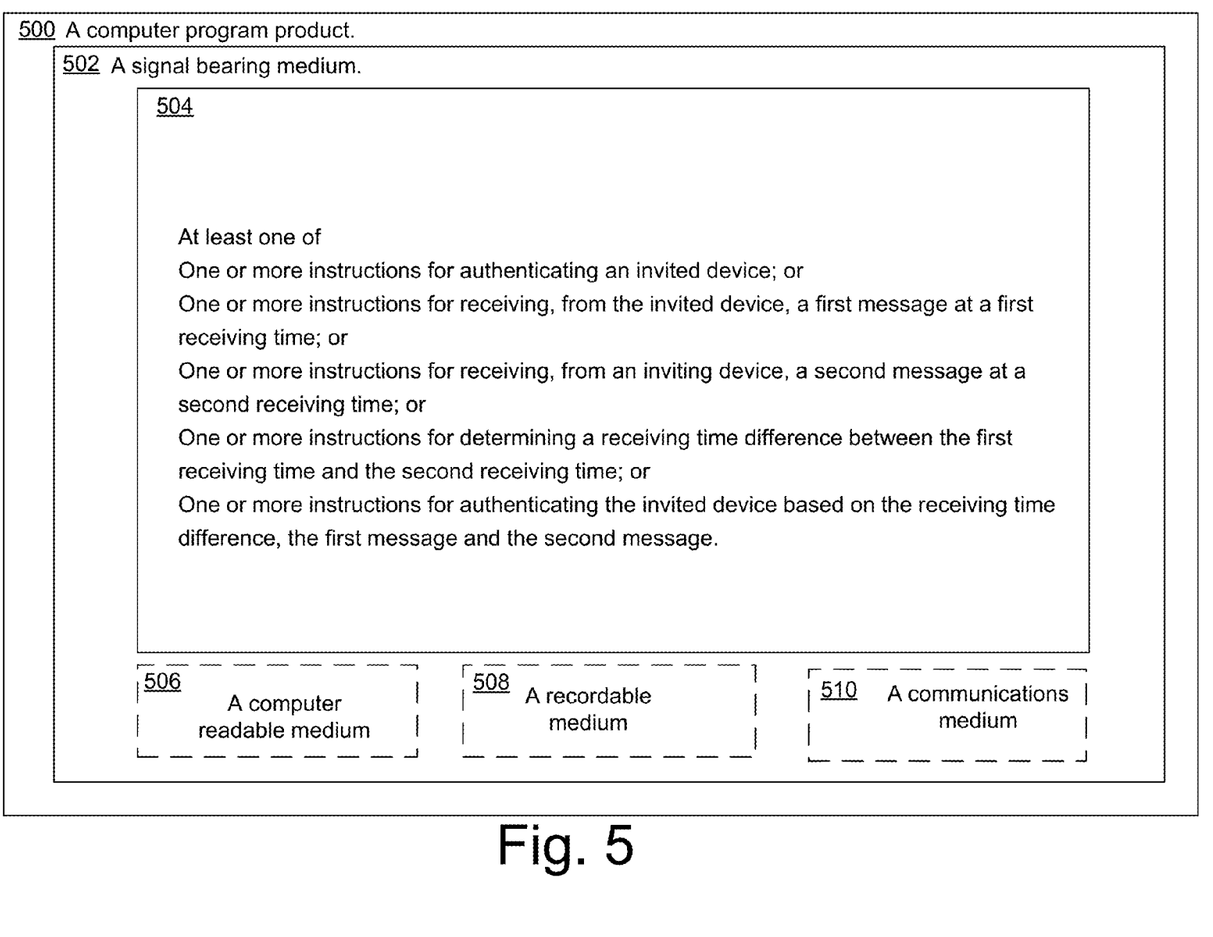
FIG. 5 illustrates an example computer program product that can be utilized to implement device authentication in an ad-hoc network.

FIG. 5 illustrates an example computer program product 500 that can be utilized to implement device authentication in an ad-hoc network, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, processor 112, 222, 232 may undertake one or more of the blocks shown in FIG. 5 in response to instructions 504 conveyed to the system 100 by signal bearing medium 502.

In some implementations, signal bearing medium 502 may encompass a computer-readable medium 506, such as, but not limited to, a hard disk drive (HDD), a compact disc (CD), a digital video disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communication medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communication medium conforming with the IEEE 802.11 standard).

Figure 6:
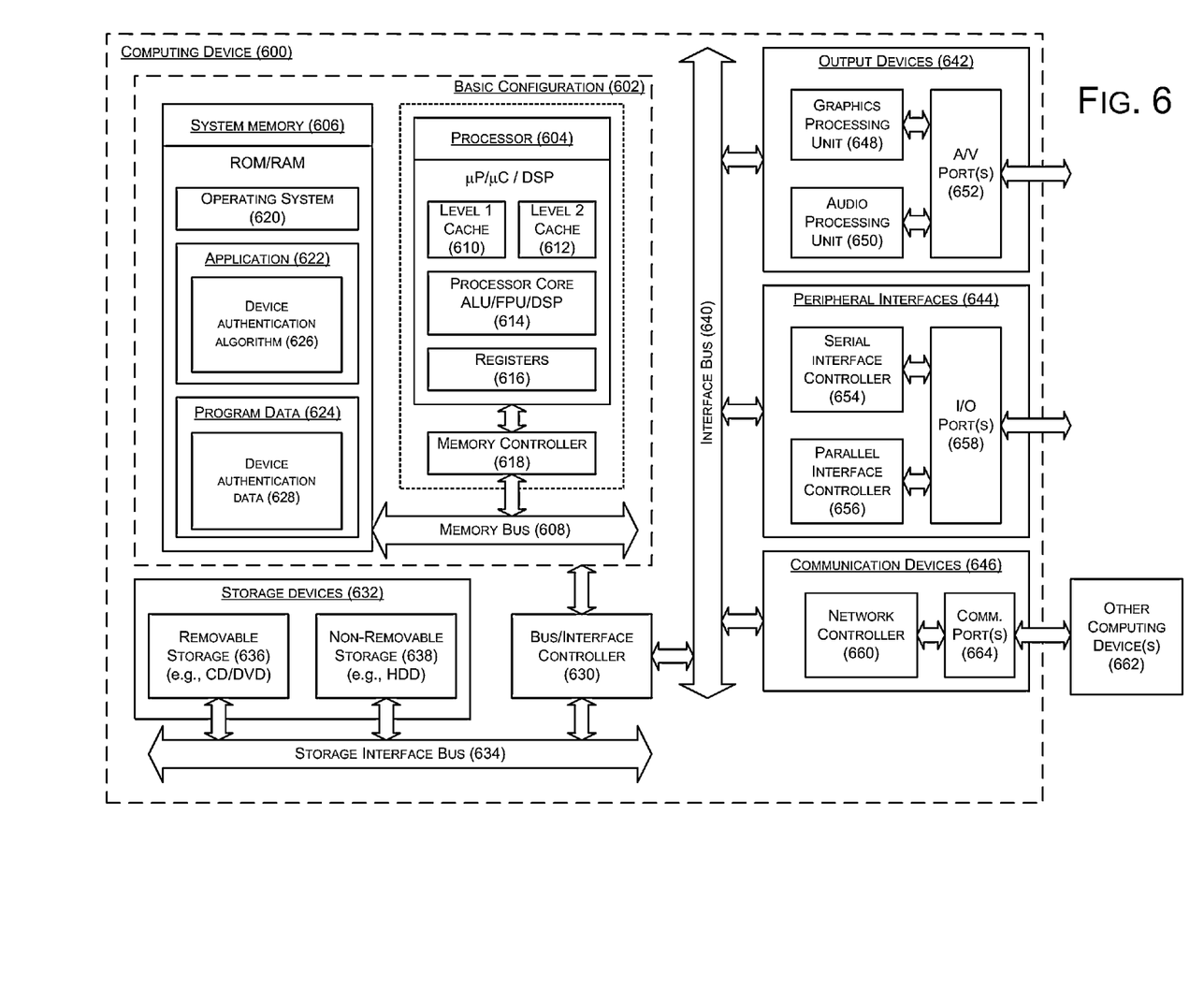
FIG. 6 is a block diagram illustrating an example computing device that is arranged to implement device authentication in an ad-hoc network.

FIG. 6 is a block diagram illustrating an example computing device 600 that is arranged to implement device authentication in an ad-hoc or decentralized networks, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a device authentication algorithm 626 that is arranged to perform the functions as described herein including those described with respect to system 100 of FIGS. 1-5. Program data 624 may include device authentication data 628 that may be useful for device authentication in an ad-hoc network as is described herein. In some embodiments, application 622 may be arranged to operate with program data 624 on operating system 620 such that device authentication in an ad-hoc network may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to authenticate an invitee device, the method comprising:
   receiving, by an evaluator device from the invitee device, at a first receive time, a first message, wherein:
      the invitee device is different from the evaluator device,
      a first communication link, of a first security level, is established between the invitee device and an inviter device prior to the receipt of the first message by the evaluator device,
      the inviter device is different from the evaluator device, and
      the inviter device is different from the invitee device;
   receiving, by the evaluator device from the inviter device, at a second receive time, a second message through a second communication link of a second security level, wherein the first security level is higher than the second security level;
   determining, by the evaluator device, a receive time difference between the first receive time and the second receive time; and
   authenticating, by the evaluator device, the invitee device based on the receive time difference, the first message, and the second message.

2. The method of claim 1, further comprising, prior to receipt of the first message and the second message by the evaluator device:
   establishing, by the inviter device, the first communication link with the invitee device;
   determining, by the inviter device, a start time;
   sending, by the inviter device to the invitee device, an indication of the start time through the first communication link; and
   sending, by the inviter device to the evaluator device, the second message at the start time.

3. The method of claim 2, further comprising prior to sending, by the inviter device to the invitee device, the indication of the start time, encrypting, by the inviter device, the indication of the start time.

4. The method of claim 2, further comprising:
   receiving, by the invitee device from the inviter device, the indication of the start time through the first communication link; and
   sending, by the invitee device to the evaluator device, the first message at the start time.

5. The method of claim 1, wherein receiving the first message includes receiving an identification associated with the inviter device.

6. The method of claim 1, further comprising:
   in response to the authentication of the invitee device, establishing, by the evaluator device, a third communication link with the invitee device;
   sending, by the evaluator device to the invitee device, a digital certificate through the third communication link; and
   determining, by the evaluator device, an expiration time of the digital certificate.

7. The method of claim 1, further comprising:
   sending, by the inviter device to the invitee device and through the first communication link, an indication of a time interval; and
   repeatedly sending, by the inviter device to the evaluator device, the second message at a period that corresponds to the time interval.

8. The method of claim 7, further comprising:
   receiving, by the invitee device from the inviter device and through the first communication link, the indication of the time interval; and
   repeatedly sending, by the invitee device to the evaluator device, the first message at the period that corresponds to the time interval.

9. The method of claim 1, wherein at least one of the invitee device and the inviter device is disposed in a vehicle that includes a relative positioning system sensor and a monitor unit.

10. A system configured to authenticate an invitee device, the system comprising:
   an evaluator device different from the invitee device, wherein the evaluator device is configured to be in communication with an inviter device, wherein the inviter device is different from the evaluator device and different from the invitee device, wherein the inviter device is configured to be in communication with the invitee device through a first communication link of a first security level, and
   wherein the evaluator device is configured to:
      receive, at a first receive time, a first message from the invitee device;
      receive, at a second receive time, a second message from the inviter device through a second communication link of a second security level, wherein the first security level is higher than the second security level;

determine a receive time difference between the first receive time and the second receive time; and authenticate the invitee device based on the receive time difference, the first message, and the second message.

11. The system of claim 10, wherein the inviter device is configured to:

establish the first communication link with the invitee device prior to the receipt of the first message and the second message by the evaluator device;

determine a start time;

send an indication of the start time to the invitee device through the first communication link; and send the second message to the evaluator device at the start time.

12. The system of claim 11, wherein the inviter device is further configured to encrypt the indication of the start time.

13. The system of claim 11, wherein the invitee device is configured to:

receive the indication of the start time from the inviter device through the first communication link; and send the first message to the evaluator device at the start time.

14. The system of claim 10, wherein the inviter device is configured to:

send an indication of a time interval to the invitee device through the first communication link; and repeatedly send the second message to the evaluator device at a period that corresponds to the time interval.

15. The system of claim 10, wherein at least one of the invitee device and the inviter device is disposed in a vehicle that includes a relative positioning system sensor and a monitor unit.

16. A method to authenticate an invitee device, the method comprising, by an inviter device:

establishing a first communication link of a first security level with the invitee device, wherein the inviter device is different from the invitee device;

determining a start time;

sending an indication of the start time to the invitee device through the first communication link; and sending a first message to an evaluator device at the start time, wherein the evaluator device is different from the inviter device, and wherein the evaluator device is different from the invitee device;

by the invitee device:

receiving the indication of the start time from the inviter device through the first communication link; and sending a second message to the evaluator device through a second communication link of a second security level at the start time, wherein the first security level is higher than the second security level; and by the evaluator device:

receiving, at a first receive time, the first message from the invitee device;

receiving, at a second receive time, the second message from the inviter device;

determining a receive time difference between the first receive time and the second receive time; and authenticating the invitee device based on the receive time difference, the first message, and the second message.

17. The method of claim 16, further comprising, by the inviter device, prior to sending the indication of the start time, encrypting the indication of the start time.

18. The method of claim 17, wherein sending the first message includes sending an identification associated with the inviter device.

* * * * *